United States Patent [19]

St. Germain et al.

[11] Patent Number: 4,914,913
[45] Date of Patent: Apr. 10, 1990

[54] LOAD RESPONSIVE FLOW AMPLIFIED CONTROL SYSTEM FOR POWER STEERING

[75] Inventors: Gene R. St. Germain, Plainfield; John B. Waggoner, Shorewood, both of Ill.

[73] Assignee: Caterpillar Inc., Peoria, Ill.

[21] Appl. No.: 346,965

[22] Filed: May 3, 1989

[51] Int. Cl.$^4$ .................. B62D 5/08; B62D 5/097; F15B 13/042
[52] U.S. Cl. .................. 60/384; 60/386; 60/450; 60/462; 137/106; 137/596; 180/132; 180/133
[58] Field of Search ............... 60/384, 385, 386, 450, 60/402, 459, 462; 91/6, 28, 29, 31, 446, 448, 461, 467; 137/106, 596; 180/132, 133, 141, 143

[56] References Cited

U.S. PATENT DOCUMENTS

| | | |
|---|---|---|
| 3,566,749 | 3/1971 | Allen et al. ................ 91/445 |
| 4,006,663 | 2/1977 | Baatrup et al. ............. 91/6 X |
| 4,311,006 | 1/1982 | Becker .................... 60/385 |
| 4,535,678 | 8/1985 | Thomsen et al. ............ 91/29 |
| 4,548,035 | 10/1985 | Thomsen et al. ............ 60/384 |

OTHER PUBLICATIONS

Pages from a Service Manual for a 992 Wheel Loader, Published by Caterpillar Inc. in Oct. 1981.

*Primary Examiner*—Robert E. Garrett
*Assistant Examiner*—George Kapsalas
*Attorney, Agent, or Firm*—John W. Grant

[57] ABSTRACT

Flow amplified control systems are useful in pilot operated steering systems. The load responsive flow amplified control system includes a directional control valve movable to an operating position to direct fluid from the operating fluid circuit through a variable orifice to a steering motor and to direct control fluid from a control fluid circuit through another variable orifice to be combined with the fluid going to the steering motor. The operating fluid circuit and the control fluid circuit are provided with fluid from a common variable displacement pump. The directional control valve is moved to an operating position by the control fluid acting thereon and is pressure compensated insofar as the flow of control fluid passing through the another variable orifice such that a substantially constant predetermined pressure differential exists across the another variable orifice. The rate of fluid flow in the pilot control circuit is determined by a steering control valve and is utilized for controlling the position of the directional control valve. The displacement of the variable displacement pump is responsive to the pressure condition in the pilot control circuit such that a substantially constant predetermined pressure differential exists between the variable displacement pump and the load pressure in the steering motor. The relative size of the variable orifices determines the amplification ratio between the pilot control circuit and the power operating circuit.

10 Claims, 1 Drawing Sheet

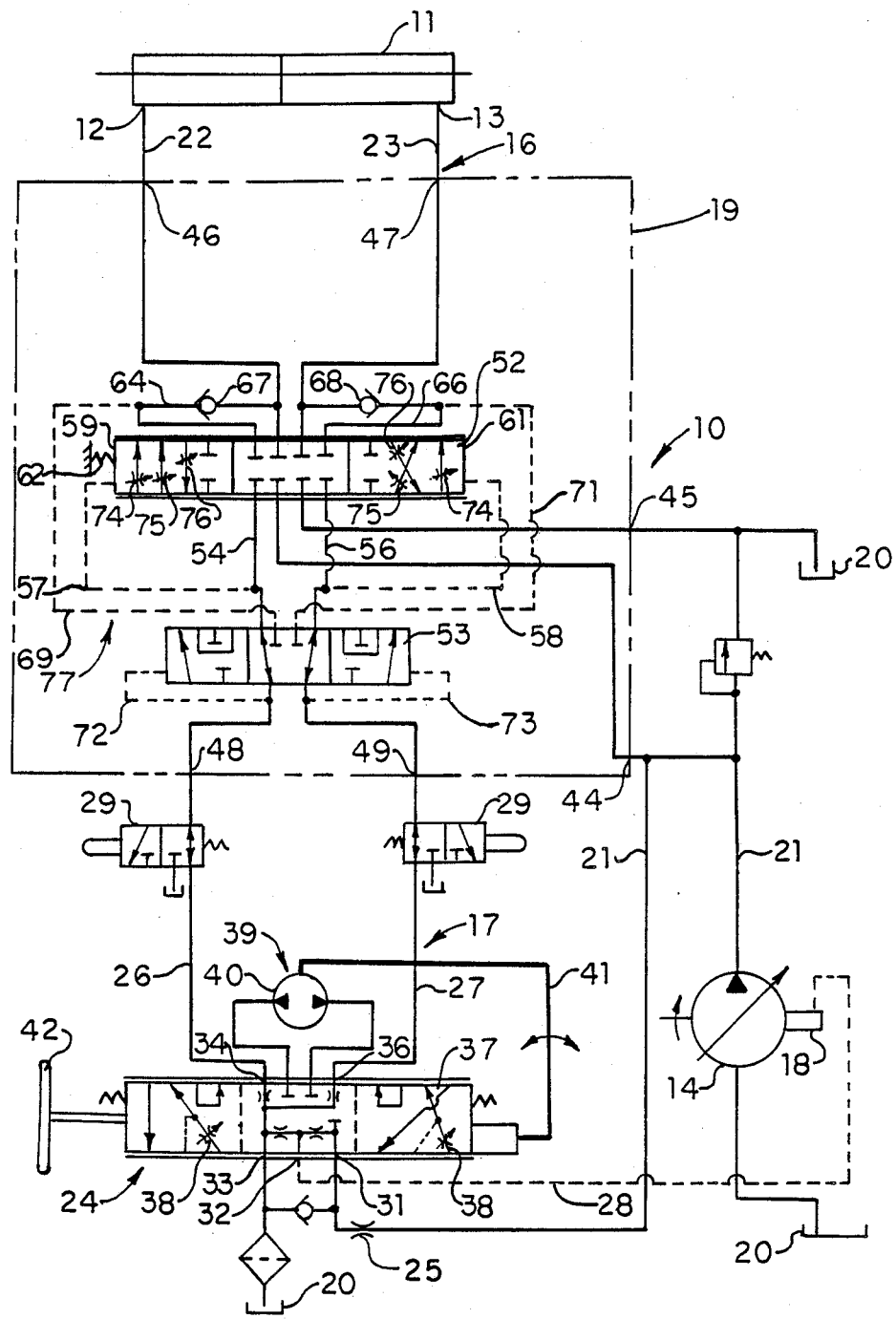

LOAD RESPONSIVE FLOW AMPLIFIED CONTROL SYSTEM FOR POWER STEERING

BACKGROUND OF THE INVENTION

1. Field of the Invention

This invention relates to a flow amplified control system and more particularly to a load responsive flow amplified control system in which the ratio of amplification between the operating fluid circuit and the control fluid circuit can be varied throughout a range of operation.

2. Description of the Prior Art

Flow amplified steering systems are sometimes used on earthmoving and industrial type mobile vehicles. Such systems normally comprise a pilot or control fluid circuit and a main steering or operating fluid circuit. The main steering circuit usually includes a pilot operated directional control valve which controls the flow of pressurized fluid from a source pump to and from one or more bidirectional steering motors. The basic component of the pilot circuit is normally a hand metering unit which directs a metered volume of fluid to a selected end of the directional control valve in response to rotation of a steering wheel connected to the hand metering unit. The degree of movement of the directional control valve is controlled by the degree of rotation of the steering wheel. If the steering wheel is rotated slowly a low volume of pilot fluid will be directed to the directional control valve resulting in low spool movement. A faster rotation of the steering wheel directs a larger volume of pilot fluid to the directional control valve resulting in greater movement of the directional control valve. The volume of fluid directed to the steering motor is many times greater than the volume of pilot fluid directed to the directional control valve and is dependent upon the degree of the movement of the directional control valve and thus the degree and speed of rotation of the steering wheel. One such system is disclosed in U.S. Pat. No. 3,566,749 dated Mar. 2, 1971 and issued to Allen, et al.

One version of the above described steering system used commercially for many years includes a variable flow amplification ratio throughout the operating range wherein the amplification ratio at the initial opening of the directional control valve is less than the amplification ratio at the full open position of the directional control valve.

Attempts have been made to increase the overall efficiency of some of the flow amplified steering systems by combining the pilot fluid used to move the directional control valve with the main operating fluid being directed to the steering motors. One of the problems with such systems is that heretofore combining the pilot fluid and the main supply fluid has been done through fixed-sized orifices. This essentially provides a predetermined ratio of flow amplification throughout the total operating range thereby limiting the versatility of the steering system. In many uses it is desirable to vary the ratio of flow amplification throughout the total operating range. Another problem with such systems is that they require one spool for determining the flow amplification ratio and another spool for determining the direction of the fluid flow. Both of the spools are sized to handle the full volume of the operating circuit such that the size and complexity of the valve increases.

The present invention is directed to overcoming one or more of the problems as set forth above.

SUMMARY OF THE INVENTION

In one aspect of the present invention a load responsive flow amplified control system comprises a hydraulic motor having an operating port, a motor conduit connected to the operating port, a source of pressurized fluid having a variable flow rate, a supply conduit connected to the source of fluid, a pilot line, means for directing a regulated volume of control fluid from the supply conduit to the pilot line, and means for maintaining a substantially constant pressure differential between the fluid in the supply conduit and the control fluid in the pilot line. A pressure compensated directional control valve includes a supply port connected to the supply conduit, a motor port connected to the motor conduit, a control fluid passage in communication with the pilot line, a fluid combiner passage, an elongate valve element having opposite ends and being moveable between a neutral position at which the supply port is blocked from the motor port and the control fluid passage is blocked from the fluid combiner passage and an infinitely variable operating position at which a first variable orifice is established between the control fluid passage and the fluid combiner passage and a second variable orifice is established between the supply port and the motor port, check valve means for combining the fluid in the combiner passage with the fluid in the motor port when the valve element is at an operating position, a pilot passage connected to the control fluid passage and to one end of the valve element, and spring means for resisting movement of the valve element toward the operating position. A means is provided for communicating the fluid combiner passage with the other end of the valve element.

With the present invention, a variable ratio of flow amplification is achieved by maintaining a first substantially constant predetermined pressure differential between the fluid in a supply conduit connected to a variable flow rate source of fluid and control fluid in a pilot line and by making the directional control valve pressure compensated. First and second Variable orifices are established by a valve element of the directional control valve when it is moved to an operating position. By making the directional control valve pressure compensated, a second substantially constant pressure drop is maintained across the first variable orifice between the control fluid from the pilot line and the steering motor so that a substantially constant pressure differential exists across the directional control valve between the supply conduit and the steering motor. The control fluid passing through the first variable orifice is combined with the fluid passing through the second variable orifice. The first variable orifice is sized in accordance with the pressure drop there across to provide a control fluid rate for controlling the operating position of the valve element while the second variable orifice is sized to provide the desired flow amplification relative to the control flow rate.

BRIEF DESCRIPTION OF THE DRAWINGS

The sole figure is a schematic illustration of an embodiment of the present invention.

DETAILED DESCRIPTION OF THE PREFERRED EMBODIMENT

Referring to the drawing a load responsive flow amplified steering system 10 includes a bidirectional hydraulic steering motor 11 having a pair of operating ports 12,13, a variable displacement pump 14, a power operating fluid circuit 16, and a control fluid circuit 17. The variable displacement pump 14 has a pressure responsive displacement control 18 associated therewith. The operating fluid circuit 16 includes a pressure compensated directional control valve 19, a tank 20, a supply conduit 21 connected to the variable displacement pump 14 and to the directional control valve 19, and a pair of motor conduits 22,23 connected to the directional control valve 19 and to the operating ports 12,13 respectively of the steering motor 11. The control fluid circuit 17 includes a steering control valve 24 connected to the supply conduit 21 through a flow control orifice 25 disposed ahead of the steering control valve, and a pair of pilot lines 26,27 connected to the steering control valve 24 and to the directional control valve 19. A load signal line 28 connects the steering control valve 24 to the displacement control 18. A neutralizer valve 29 is disposed in each of the pilot lines.

The steering control valve 24 in this embodiment is the type commonly referred to as a hand metering unit and includes a fluid inlet port 31 connected to the supply conduit 21, a load signal port 32 connected to the load signal line 28, a return port 33 connected to the tank 20, a left turn port 34 connected to the pilot line 26 and a right turn port 36 connected to the pilot line 27. The steering control valve further includes a valving arrangement illustrated in the drawing as a valve element 37 which is moveable from a neutral position to either a right turn position or a left turn position. In either of the turn positions the valve element 37 establishes a variable orifice 38 between the inlet port 31 and the respective left or right turn port. A steering wheel 42 is conventionally connected to the valve element 37 for moving the valve element 37 to the turn position. A means 39 is provided for directing a regulated volume of pressurized control fluid from the supply conduit 21 through the variable orifice 38 and into the respective pilot line 26 or 27 when the valve element 37 is moved to one of the turn positions. The means 39 can be for example a gerotor metering mechanism 40 connected to the valving arrangement 37 by means of a direct mechanical link 41. The load signal line 28 and the displacement control 18 of the pump 14 provide a means 43 for maintaining a substantially constant pressure differential between the fluid in the supply conduit 21 and the control fluid in the downstream side of the orifice 38 when the valve element 37 is in one of the turn positions.

The directional control valve 19 includes a supply inlet port 44 connected to the supply conduit 21, an outlet port 45 connected to the tank 20, a pair of motor ports 46,47 connected to the motor conduits 22,23, respectively, a pair of control fluid ports 48,49 connected to the pilot lines 26,27, respectively, an elongate valve element 52, and a shuttle valve element 53. A pair of control fluid passages 54,56 extend between the valve elements. A pair of pilot passages 57,58 connect the control fluid passages 54,56 with opposite ends 59,61 of the valve element 52. A spring 62 is disposed at the end 59 of the valve element 52 in a preloaded condition to resist movement of the valve element 52 in either direction. A pair of fluid combiner passages 64,66 are connected to the motor ports 46,47, respectively, through a pair of check valves 67,68. A pair of signal passages 69,71 connect the valve element 53 with the fluid combiner passages 64,66 respectively. Another pair of pilot passages 72,73 individually connect the control fluid ports 48,49 with the opposite ends of the shuttle valve element 53. The valve element 52 is moveable between a neutral and left and right turn positions. At the turn positions a plurality of infinitely variable orifices 74,75,76 are established between the various ports and passages as hereinafter described in more detail.

At the neutral position of the valve element 52, the supply inlet port 44, the outlet port 45, the motor ports 46,47, the control fluid passages 54,56 and the fluid combiner passages 64,66 are all blocked from each other. With the valve element 52 moved rightwardly to the left turn position, the supply inlet port 44 is in fluid communication with the motor port 46 through the variable orifice 75, the control fluid passage 54 is in communication with the fluid combiner passage 64 through the variable orifice 74, the motor port 47 is in communication with the outlet port 45 through the variable orifice 76 and the control fluid passage 56 is blocked from the fluid combiner passage 66. Similarly with the valve element moved leftwardly to the right turn position, the supply inlet port 44 is in communication with the motor port 47 through the variable orifice 75, the control fluid passage 56 is in communication with the fluid combiner passage 66 through the variable orifice 74, the motor port 46 is in communication with the outlet port 45 through the variable orifice 76 and the control fluid passage 54 is blocked from the fluid combiner passage 64.

The shuttle valve element 53 is moveable between the centered neutral position shown and first and second actuated positions. At the neutral position the control fluid ports 48,49 are in communication with the control fluid passages 54,56 respectively and the pilot passages 57,58 respectively, and the signal passages 69,71 are blocked from each other and from the control fluid passages 54 and 56 and the pilot passages 57,58. With the shuttle element 53 moved rightwardly to a first actuated position the control fluid port 48 is in communication with the control fluid passage 54 and the pilot passage 57, the signal passage 69 is in communication with the control fluid passage 56 and the pilot passage 58 and the control fluid port 49 and the signal passage 71 are blocked. Similarly with the shuttle valve element 53 moved leftwardly to the second actuated position the control fluid port 49 is in communication with the control fluid passage 56 and the pilot passage 58, the signal passage 71 is in communication with the control fluid passage 54 and the pilot passage 57, and the control fluid port 48 and the signal passage 69 are blocked.

The shuttle valve element 53, the pilot passages 57,58, and the signal passages 69,71 provide a means 77 for communicating the fluid combiner passages 64,66 with the ends 59,61 respectively of the valve element 52 when the valve element is in the turn position.

INDUSTRIAL APPLICABILITY

Prior to being put into operation but with the prime mover connected to the pump 14 operating, the signal port 32 is vented to the tank 20 through the outlet port 33 such that the displacement controller 18 maintains the displacement of the pump 14 at a setting to provide a minimum standby pressure in the supply conduit 21.

To initiate a right turn the operator rotates the steering wheel 42 in the appropriate direction to move the steering control valve 24 to the left to direct pressurized fluid from the inlet port 31 through the variable orifice 38, the geroter metering mechanism 40, and into the pilot line 26. The geroter metering mechanism 40 is responsive to movement of the steering control valve 24 and functions to measure or regulate the amount or volume of control fluid passing through the steering control valve 24 dependent upon the degree of rotation of the steering wheel. A pressure drop is generated in the fluid passing across the variable orifice 38 and the pressure downstream of the variable orifice is transmitted through the load signal line 28 to the displacement controller 18 which now functions to maintain the pressure differential across the orifice at a predetermined level. In this embodiment the pressure differential is about 2200 kPa. It is recognized that other pressure drops will occur as the fluid passes through the various passages in the valves and the connecting lines or conduits. However, for an understanding of this invention, such incidental pressure drops are being ignored and the 2200 kPa pressure differential is deemed to exist between the supply conduit 21 and the pilot line 26 and the control fluid passage 54.

The pressurized control fluid in the pilot line 26 passes through the control fluid port 48, the shuttle valve element 53, and into the control fluid passage 54 and the pilot passage 57. The control fluid passage 54 is initially blocked by the valve element 52 and the pressure in the control fluid passage 54 and control fluid port 48 starts to increase due to the spring 62 resisting movement of the spool 52 to the right. The initial increase in the control fluid pressure is immediately transmitted through the pilot passage 72 resulting in a pressure differential in the pilot passages 72 and 73 causing the shuttle valve element 53 to move to the right to the first actuated position to maintain communication between the control fluid port 48 and the control fluid passage 54 and the pilot passage 57, and to communicate the pilot passage 58 with the signal passage 69. This establishes a flow path from the end 61 of the valve element 52 through the pilot passage 58, the signal passage 69 and the motor port 64 to the check valve 67. However, since the load pressure in the motor port 46 acts against the back side of the check valve 67, the pressure of the control fluid must increase to a level which is greater than the load pressure in the motor port 46 by an amount equivalent to the preload of the spring 62 before the valve element 52 can move to the right. Once the pressure of the control fluid reaches such level, the valve element 52 will move to the right. The fluid exhausted from the end 61 of the valve element 52 is transmitted through the pilot passage 58, the signal passage 69 and into the combiner passage 64 where it unseats the check valve 67 and passes into the motor port 46.

As previously noted with the valve element 52 in a right turn position three variable orifices 74, 75 and 76 are established across the valve element 52. At the right turn position the control fluid from the control fluid passage 54 passes through the variable orifice 74, the fluid combiner passage 64, the check valve 67 and into the motor port 46. Also pressurized operating fluid from the supply conduit 21 passes through the inlet port 44, the variable orifice 75, the motor port 46, the motor conduit 22 and into the steering motor 11. The combined flow of fluid passing through the variable orifices 74 and 75 and into the steering motor moves the steering motor to a right turn position. The fluid exhausted from the steering motor passes through the variable orifice 76 to the tank 20.

The flow of control fluid across the orifice 74 generates a pressure drop with the fluid pressure downstream thereof now being transmitted through the signal passage 69, the shuttle valve element 53, a portion of the control fluid passage 56 and the pilot passage 58 to the end 61 of the valve element 52. Since the pressure upstream and downstream of the variable orifice 74 acts on the opposite ends 59 and 61, respectively, of the valve element 52, the valve element 52 functions as a pressure compensated valve to maintain a substantially constant predetermined pressure drop across the variable orifice 74 as determined by the force of spring 62. In this embodiment the pressure drop is about 300 kPa. Thus since a pressure differential of about 2200 kPa is maintained across the orifice 38 between the supply conduit 21 and the pilot line 26 and a pressure differential of about 300 kPa is maintained across the orifice 74 between the pilot line 26 and the motor conduit 22, a pressure differential of about 2500 kPa exists between the supply conduit 21 and the motor port 46.

Since the pressure of the control fluid downstream of the variable orifice 38 is responsive to the load on the steering motor 11 by virtue of the flow path between the steering control valve 24 and the steering motor operating port 12, the pilot control circuit is essentially a load sensing circuit whereby the displacement of the pump 14 is adjusted to provide sufficient flow through the supply conduit 21 to maintain the 2200 kPa pressure differential across the orifice between the supply conduit 21 and the pilot line 26. Moreover since the operating fluid passing through the orifice 75 also comes from the supply conduit 21, sufficient flow is provided by the pump 14 to maintain essentially a 2500 kPa pressure drop across the orifice 75. The flow control orifice 25 is sized to fine tune the system.

The rotational speed of the steering wheel determines the amount of movement of the valve element 52 to a turn position and how quickly it reaches such position while the number of revolutions of the steering wheel determines how long the valve element will remain at the turn position and hence the amount of movement of the steering motor 11. Once rotation of the steering wheel is stopped, the flow of control fluid through the pilot line 26 stops, and the valve element 52 returns to the neutral position shown under the influence of the spring 62 to hydraulically lock the steering motor 11 at the turn position. The steering motor 11 is returned to its starting position by turning the steering wheel in a left turn direction thereby causing the valve element 52 to move leftwardly in a manner similar to that described above.

The 300 kPa pressure drop in the pilot control circuit 17 across the variable orifice 74 and the 2500 kPa pressure differential in the power operating circuit 16 between the supply conduit 21 and the motor conduit 22 are utilized to determine the sizes of the variable orifices 74 and 75 throughout the operating range of movement of the valve element 52 for a desired flow amplification ratio which thereby determines steering speed. For example, when a constant pressure drop is maintained across an orifice, the size of the orifice for a desired flow rate is easily calculated by using a known formula. Thus, if the flow rate of the control fluid passing through the orifice 74 is known, the size of the orifice 74 at a given position of the valve element 52 can be calculated based on the 300 kPa pressure drop. Likewise, the size of the variable orifice 75 at the same position of the valve element 52 to achieve a desired steering speed can be calculated based on the 2500 kPa pressure differential. This procedure could be repeated for a number of spool positions throughout the operating range of the valve element 52 to determine the appropriate sizes of the orifices 74,75 at each spool position. The ratio of the sizes of the orifices 74 and 75 approximates the amplification ratio.

In this embodiment a variable flow amplification is provided to enhance the versatility of the steering control system. More specifically, a flow amplification ratio of about 10:1 is provided at the initial establishment of the variable orifices 74,75. The ratio remains substantially the same for about 50-60% of the total movement of the valve element 52 and then gradually increases to about 20:1 as the valve element moves to the full open turn position. Since steering at high travel speeds is normally done with the valve element 52 at the 10:1 operating range and steering at the slower working speeds is done with the valve element at the 20:1 operating range. This control system provides fine steering control for high speed travel and fast steering control during the slower working speeds. The above ratios are by way of example only and may be changed to provide the desired steering characteristics for a particular vehicle.

The neutralizer valves 29 operate in the usual manner to neutralize the steering system 10 when the steering motor 11 reaches a predetermined limit of extension. More specifically, when such condition is reached, an element (not shown) of the vehicle engages and moves the appropriate neutralizer valve to a position to block the flow of control fluid through the respective pilot line 26,27 and vents the respective pilot line between the neutralizer valve and the directional control valve 19. This causes the valve element 52 to move to the neutral position shown to hydraulically lock the steering motor in the turn position.

In view of above, the present invention provides an improved load responsive flow amplified control system in which a variable ratio of flow amplification is achieved dependent upon the operating position of the directional control valve. This is accomplished by first making the pilot control circuit load sensing so that the output of the variable displacement pump is controlled to maintain a first substantially constant predetermined pressure drop across the steering control valve between the supply conduit and the pilot control circuit and second by making the directional control valve pressure compensated to maintain a second substantially constant predetermined pressure drop across the directional control valve between the pilot control circuit and the steering motor so that a substantially constant predetermined pressure differential exists across the directional control valve between the supply conduit and the steering motor. The directional control valve establishes a variable orifice between the pilot control circuit and the steering motor and another variable orifice between the supply conduit and the steering motor at the operating position thereof. The first mentioned variable orifice is sized in accordance with the pressure drop there across to provide a control flow rate while the second variable orifice is sized in accordance with the pressure differential between the supply conduit and the steering motor to provide the desired flow amplification relative to the control flow rate.

Other aspects, objects, and advantages of this invention can be obtained from a study of the drawings, the disclosure, and the appended claims.

We claim:

1. A load responsive flow amplified control system comprising:
   a hydraulic motor having an operating port;
   a motor conduit connected to the operating port;
   a source of pressurized fluid having a variable flow rate;
   a supply conduit connected to the source of fluid;
   a pilot line;
   means for directing a regulated volume of control fluid from the supply conduit to the pilot line;
   means for maintaining a substantially constant pressure differential between the fluid in the supply conduit and the control fluid in the pilot line;
   a pressure compensated directional control valve having a supply port connected to the supply conduit, a motor port connected to the motor conduit, a control fluid passage in communication with the pilot line, a fluid combiner passage, an elongate valve element having opposite ends and being movable between a neutral position at which the supply port is blocked from the motor port and the control fluid passage is blocked from the fluid combiner passage and an infinitely variable operating position at which a first variable orifice is established between the control fluid passage and the fluid combiner passage and a second variable orifice is established between the supply port and the motor port, check valve means for combining the fluid in the combining passage with the fluid in the motor port when the valve element is at an operating position, a pilot passage connected to the control fluid passage and one end of the valve element, and spring means for resisting movement of the valve element toward the operating position; and
   means for communicating the fluid combiner passage with the other end of the valve element.

2. The control system of claim 1 including a flow control orifice in the supply conduit ahead of the maintaining means.

3. The control system of claim 1 wherein the source of pressurized fluid includes a variable displacement pump.

4. A load responsive flow amplified steering control system comprising:
   a bidirectional steering motor having a pair of operating ports at opposite sides thereof;
   first and second motor conduits individually connected to the operating ports;
   a source of pressurized fluid having a variable flow rate;
   a supply conduit connected to the source of pressurized fluid;
   first and second pilot lines;
   a steering control valve connected to the supply conduit and to the pilot lines and having a valve element movable between a neutral position and infinitely variable left and right turn positions at which the valve element establishes first and second variable orifices between the supply conduit and the first and second pilot lines in the left and right turn positions respectively and means for directing a regulated volume of pressurized control fluid from the supply conduit through the respective variable orifice and into the respective pilot line when the valve element is moved to the left or right turn position;

means for maintaining a substantially constant pressure differential between the fluid in the supply conduit and the control fluid downstream of the respective variable orifice when the valve element is in the left or right turn position;

a pressure compensated directional control valve having a supply port connected to the supply conduit, a pair of motor ports connected to the motor conduits, a pair of control fluid passages in communication with the pilot lines, a pair of fluid combiner passages, an elongate valve element having opposite ends and being movable between a neutral position at which the supply port is blocked from the motor ports and the control fluid passages are blocked from the fluid combiner passages and an infinitely variable turn position at which a first variable orifice is established between one of the control fluid passages and one of the fluid combiner passages and a second variable orifice is established between the supply port and one of the motor ports, check valve means for combining the fluid in the one combining passage with the fluid in the one motor port when the valve element is at a turn position, a pair of pilot passages connected to the control fluid passages and the ends of the valve element, and spring means for resisting movement of the valve element toward the turn position;

means for communicating one of the fluid combiner passages with one end of the valve element when the valve element is at said turn position.

5. The control system of claim 4 wherein said means for communicating includes a pair of signal passages connected to the fluid combiner passages, a pair of pilot passages connected to the control fluid passages and to the ends of the valve element, and a shuttle valve element movable between a neutral position at which the signal passages are blocked from each other and from the control fluid passages and an actuated position at which one of the signal passages is in communication with one of the control fluid passages and the other signal passage is blocked by the shuttle valve element.

6. The control system of claim 5 wherein the shuttle valve element is moved to the first actuated position and the valve element of the directional control valve is moved to the turn position in response to the control fluid in one of the pilot lines when the steering control valve is in one of said turn positions.

7. The control system of claim 4 including a flow control orifice in the supply conduit ahead of the steering control valve.

8. The control system of claim 4 wherein the source of pressurized fluid includes a variable displacement pump.

9. A pressure compensated directional control valve comprising:

a main supply port;

a pair of motor ports;

an outlet port;

a pair of control fluid passages;

a pair of fluid combiner passages;

a pair of check valves disposed between the fluid combiner passages and the motor ports;

a valve element having opposite ends and being movable between a neutral position at which the supply port is blocked from the motor ports and the pilot fluid passages are blocked from the fluid combiner passages, a first infinitely variable operating position at which a first variable orifice is established between one of the control fluid passages and one of the fluid combiner passages, a second variable orifice is established between the supply port and one of the motor ports and a third variable orifice is established between the other of the motor ports and the outlet port, and a second infinitely variable operating position at which another first variable orifice is established between the other of the control fluid passages and the other of the fluid combiner passages, another second variable orifice is established between the supply port and the other motor port, and another third variable orifice is established between the one motor port and the supply port;

spring means for resisting movement of the valve element toward the operating positions;

a pair of pilot passages connecting the control fluid passages with the opposite ends of the valve element; and means for communicating said one fluid combiner passage with one end of the valve element when the valve element is in said first operating position and for communicating the other fluid combiner passage with the other end of the valve element when the valve element is in the second operating position.

10. The directional control valve of claim 9 wherein said means for communicating includes a pair of signal passages connected to the fluid combiner passages and a shuttle valve element movable between a neutral position at which the signal passages are blocked from each other and from the control fluid passages and an actuated position at which one of the signal passages is in communication with one of the control fluid passages and the other signal passage is blocked by the shuttle valve element.

* * * * *